(12) United States Patent
Wiggins, III et al.

(10) Patent No.: US 8,827,299 B1
(45) Date of Patent: Sep. 9, 2014

(54) TRAILER ATTACHMENT GUIDE ASSEMBLY

(76) Inventors: Hayward D. Wiggins, III, Holly Hill, SC (US); Andrew S. Bunch, Holly Hill, SC (US)

( * ) Notice: Subject to any disclaimer, the term of this patent is extended or adjusted under 35 U.S.C. 154(b) by 42 days.

(21) Appl. No.: 13/443,497

(22) Filed: Apr. 10, 2012

(51) Int. Cl.
*B60D 1/36* (2006.01)

(52) U.S. Cl.
USPC .......................................................... 280/477

(58) Field of Classification Search
USPC .............................................. 280/477, 491.1
See application file for complete search history.

(56) References Cited

U.S. PATENT DOCUMENTS

| | | | | |
|---|---|---|---|---|
| 2,974,931 | A * | 3/1961 | Reel et al. | 410/128 |
| 3,110,506 | A * | 11/1963 | O'Brien | 410/151 |
| 3,677,562 | A * | 7/1972 | Bronstein | 410/97 |
| D270,906 | S | 10/1983 | Orr | |
| 4,737,056 | A * | 4/1988 | Hunt | 410/151 |
| 4,834,599 | A * | 5/1989 | Gordon et al. | 410/151 |
| 4,958,875 | A * | 9/1990 | Zamzow | 296/32 |
| 5,192,187 | A * | 3/1993 | Sweet | 410/151 |
| 5,281,063 | A * | 1/1994 | Austin, III | 410/151 |
| 5,290,056 | A | 3/1994 | Fath, IV | |
| 5,427,486 | A * | 6/1995 | Green | 410/118 |
| D394,640 | S * | 5/1998 | Pestone | D12/414 |
| 5,769,293 | A * | 6/1998 | Zaretsky | 224/551 |
| 5,769,580 | A * | 6/1998 | Purvis | 410/151 |
| 5,970,619 | A | 10/1999 | Wells | |
| 5,971,685 | A * | 10/1999 | Owens | 410/151 |
| 5,975,819 | A * | 11/1999 | Cola | 410/129 |
| 6,042,312 | A * | 3/2000 | Durham, II | 410/143 |
| 6,045,284 | A * | 4/2000 | Chiu | 401/289 |
| 6,178,650 | B1 | 1/2001 | Thibodeaux | |
| 6,210,090 | B1 * | 4/2001 | Wyse | 410/151 |
| 6,238,154 | B1 * | 5/2001 | DaPrato | 410/151 |
| 6,390,746 | B1 * | 5/2002 | Huang | 410/151 |
| 6,582,169 | B1 * | 6/2003 | Cano-Rodriguez et al. | 410/128 |
| 6,607,338 | B2 * | 8/2003 | Lemke | 410/151 |
| 6,733,220 | B2 * | 5/2004 | Brown et al. | 410/151 |
| 6,827,533 | B2 * | 12/2004 | Cano-Rodriguez et al. | 410/128 |
| 6,851,697 | B2 | 2/2005 | Kinnard | |
| 7,044,699 | B1 * | 5/2006 | St. Denis | 410/34 |
| 7,080,870 | B1 * | 7/2006 | McCann et al. | 296/64 |
| 7,334,973 | B2 * | 2/2008 | Scott | 410/151 |
| 7,506,887 | B2 | 3/2009 | Seely et al. | |
| 8,118,525 | B2 * | 2/2012 | Long et al. | 410/151 |
| 8,202,029 | B2 * | 6/2012 | Chou | 410/143 |
| 2003/0082024 | A1 * | 5/2003 | Scott | 410/151 |
| 2003/0178809 | A1 * | 9/2003 | Anderson | 280/477 |

* cited by examiner

*Primary Examiner* — Joseph M Rocca
*Assistant Examiner* — Conan Duda

(57) ABSTRACT

A trailer attachment guide assembly includes a rod that has a first end and a second end. The rod is selectively telescopically extendable along a longitudinal axis extending through the first and second ends. The rod may be positioned in a vehicle bed so the rod abuts opposite lateral walls of the vehicle bed. A guide post has a bottom end pivotally coupled to the rod. The guide post is selectively positionable in a deployed position extending upwardly from the rod so the guide post may be viewed from a cabin of the vehicle.

10 Claims, 4 Drawing Sheets

TRAILER ATTACHMENT GUIDE ASSEMBLY

BACKGROUND OF THE DISCLOSURE

Field of the Disclosure

The disclosure relates to trailer attachment guide devices and more particularly pertains to a new trailer attachment guide device for guiding a vehicle to a trailer hitch.

SUMMARY OF THE DISCLOSURE

An embodiment of the disclosure meets the needs presented above by generally comprising a rod that has a first end and a second end. The rod is selectively telescopically extendable along a longitudinal axis extending through the first and second ends. The rod may be positioned in a vehicle bed so the rod abuts opposite lateral walls of the vehicle bed. A guide post has a bottom end pivotally coupled to the rod. The guide post is selectively positionable in a deployed position extending upwardly from the rod so the guide post may be viewed from a cabin of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
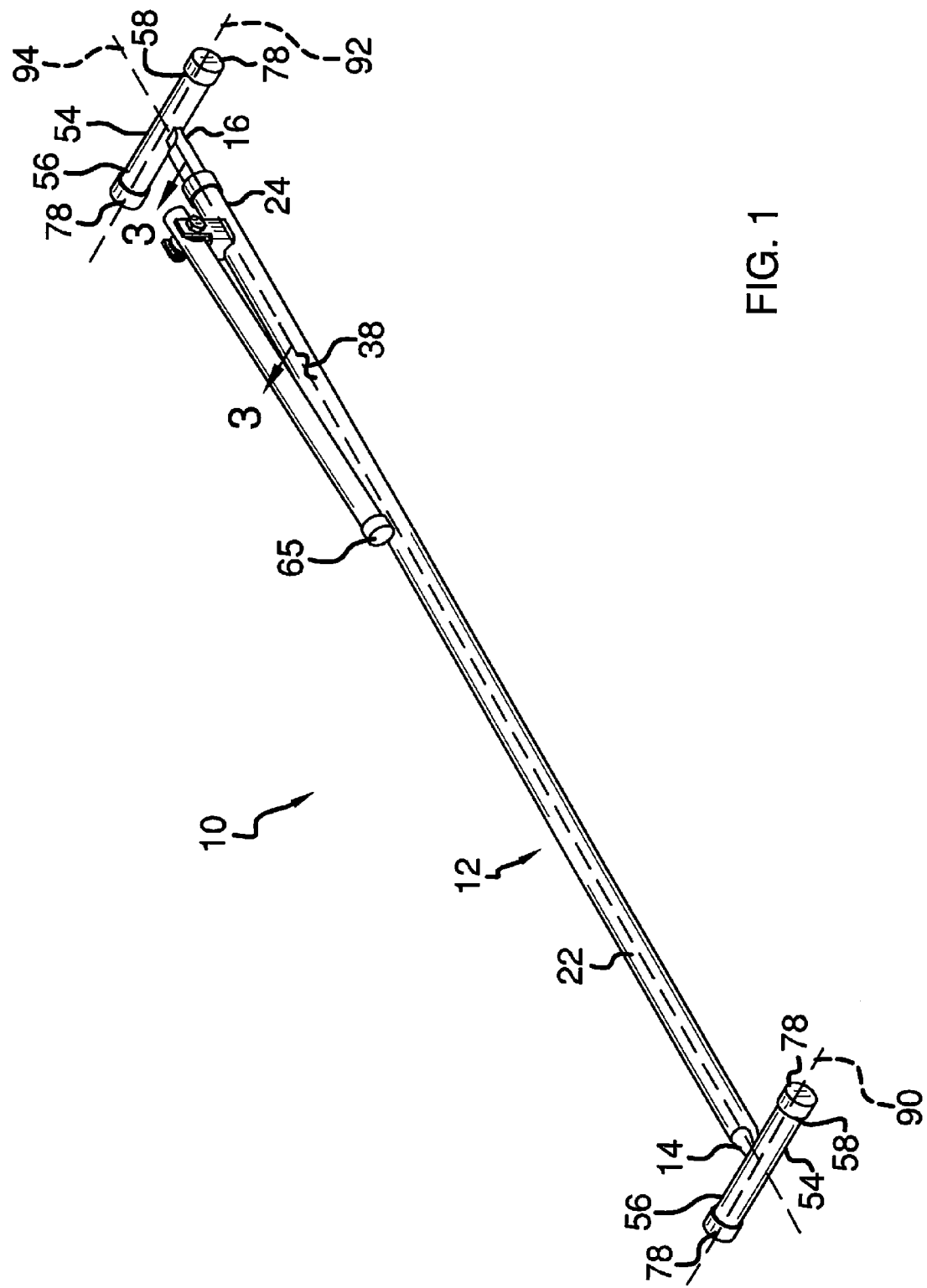
FIG. 1 is a top perspective view of a trailer attachment guide assembly according to an embodiment of the disclosure.
Figure 2:
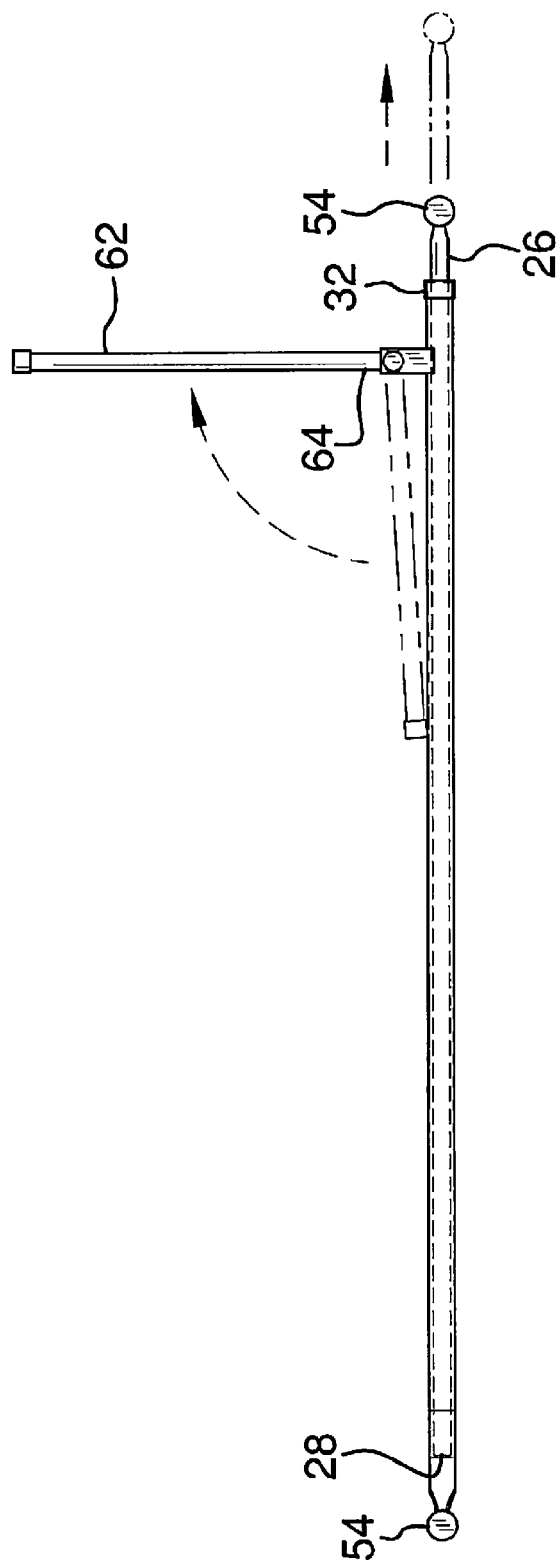
FIG. 2 is a left side view of an embodiment of the disclosure.
Figure 3:
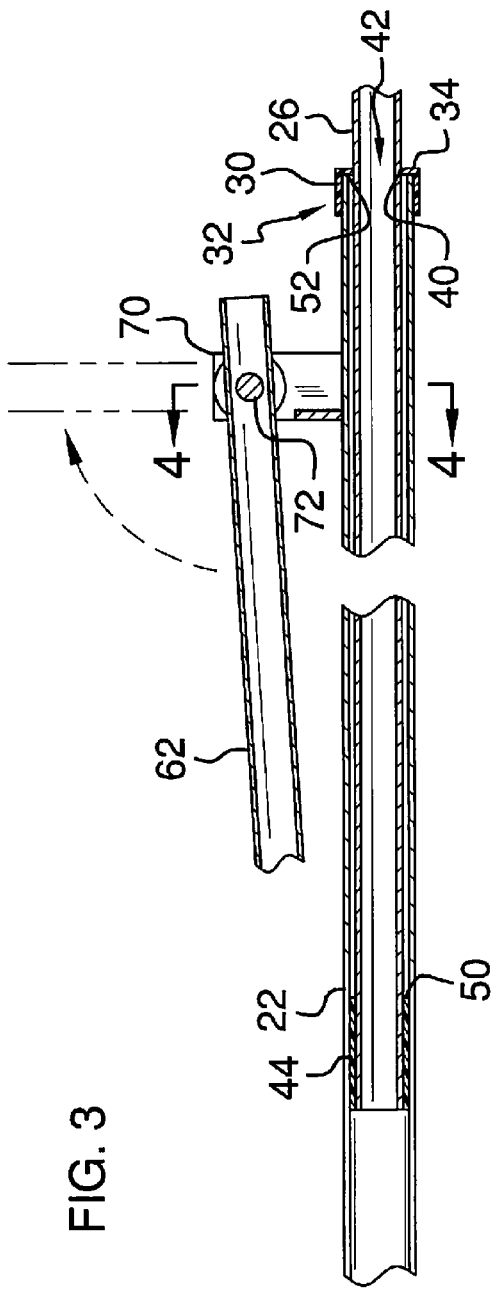
FIG. 3 is a cross sectional view taken along line 3-3 of FIG. 1 of an embodiment of the disclosure.
Figure 4:
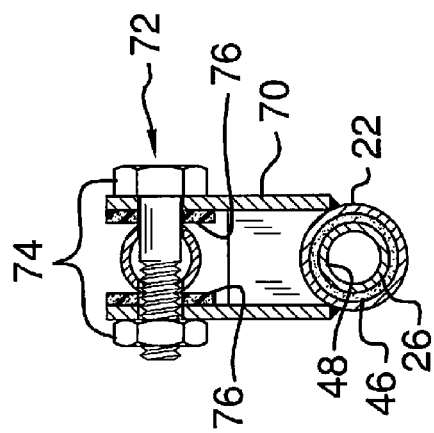
FIG. 4 is a cross sectional view taken along line 4-4 of FIG. 3 of an embodiment of the disclosure.
Figure 5:
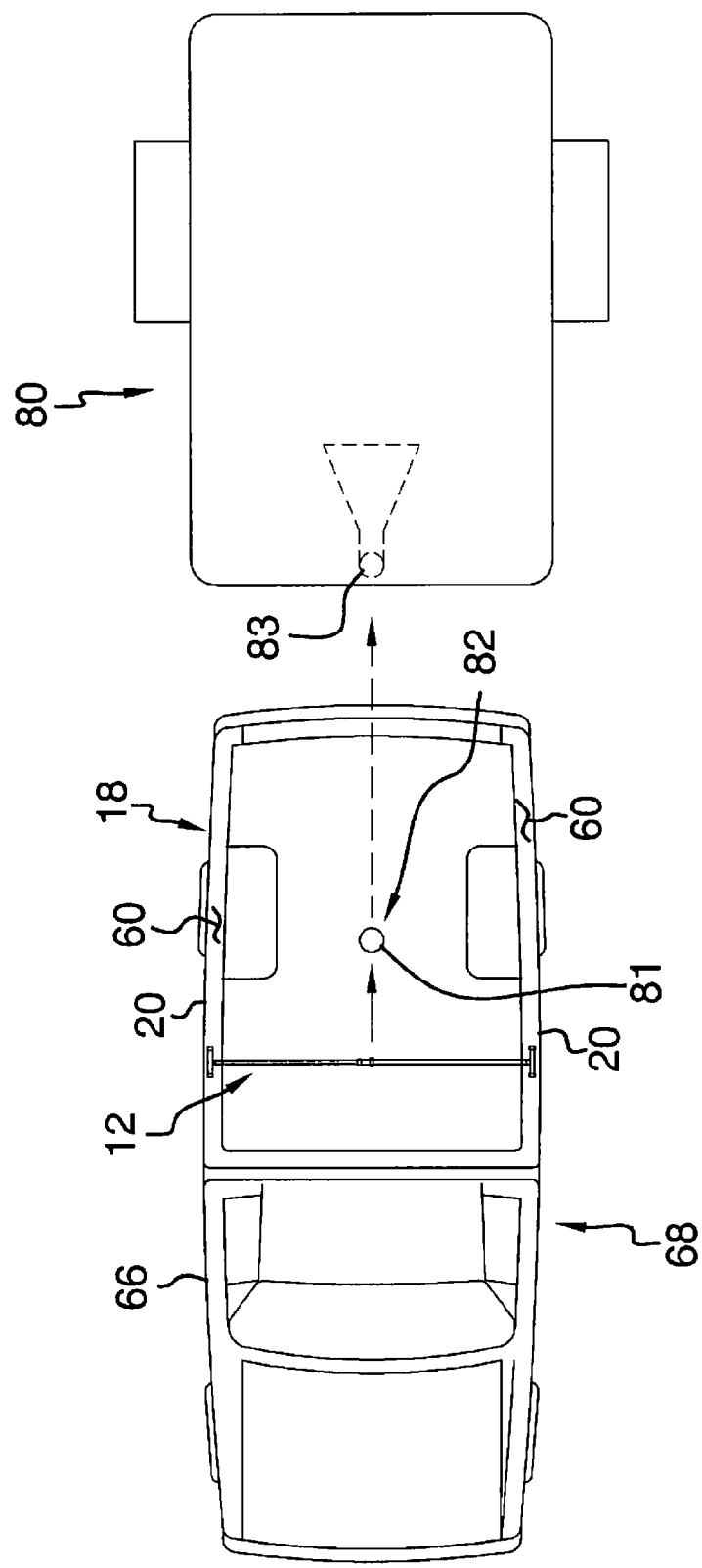
FIG. 5 is an in-use view of an embodiment of the disclosure.

With reference now to the drawings, and in particular to FIGS. 1 through 5 thereof, a new trailer attachment guide device embodying the principles and concepts of an embodiment of the disclosure and generally designated by the reference numeral 10 will be described.

As best illustrated in FIGS. 1 through 5, the trailer attachment guide assembly 10 generally comprises a rod 12 that has a first end 14 and a second end 16. The rod 12 is selectively telescopically extendable along a longitudinal axis extending through the first 14 and second 16 ends. The rod 12 may be positioned in a vehicle bed 18 so the rod 12 abuts opposite lateral walls 20 of the vehicle bed 18. The rod 12 includes a tubular first portion 22. The tubular first portion 22 has an open end 24. The tubular first portion 22 may have a length between 89 cm and 94 cm. The tubular first portion 22 may have an inside diameter between 1.5 cm and 2.5 cm.

The rod 12 includes a second portion 26 that has an insertion end 28. The open end 24 of the tubular first portion 22 insertably receives the insertion end 28 of the second portion 26 so the second portion 26 is slidably positioned within an interior of the tubular first portion 22. The second portion 26 may have a length between 89 cm and 94 cm. The second portion 26 may have an outside diameter between 1.25 cm and 1.35 cm.

The second portion 26 is positionable in a first position that has the second portion 26 positioned within the interior of the tubular first portion 22 so the second end 16 of the rod 12 is positioned adjacent to the open end 24 of the tubular first portion 22. The rod 12 is positionable in a second position that has the second portion 26 selectively extended outwardly from the interior of the tubular first portion 22 along the longitudinal axis of the rod 12 so the second end 16 of the rod 12 is extended a selectable distance away from the open end 24 of the tubular first portion 22. The selectable distance the rod 12 is extended may be equal to a distance between each of the lateral walls 20 of the vehicle bed 18.

A stopper 30 comprises a closed ring 32. The stopper 30 includes a flange 34 extending inwardly from an end 36 of the stopper 30. The stopper 30 is positioned around an outer surface 38 of the tubular first portion 22 so the open end 24 of the tubular first portion 22 abuts the flange 34. An inner edge 40 of the flange 34 forms an opening 42 to insertably receive the insertion end 28 of the second portion 26. The opening 42 may have a diameter between 1.65 cm and 1.75 cm.

A sleeve 44 is positioned around the second portion 26 adjacent to the insertion end 28 so an outside surface 46 of the sleeve 44 abuts an inner surface 48 of the tubular first portion 22. The sleeve 44 may have a thickness sufficient to bridge the difference between the outside diameter of the second portion 26 and the inside diameter of the tubular first portion 22. A front edge 50 of the sleeve 44 abuts a rear side 52 of the flange 34 when the second portion 26 is extended outwardly of the tubular first portion 22 so extension of the second portion 26 is restricted. The sleeve 44 may be comprised of a resiliently compressible material.

A pair of mounting members 54 each has a primary end 56 and a secondary end 58. Each of the mounting members 54 is coupled to an associated one of the first 14 and second 16 ends of the rod 12. Each of the mounting members 54 is oriented perpendicular to the longitudinal axis of the rod 12. Each of the mounting members 54 may have a length between 11.5 cm and 14 cm. Each of the mounting members 54 abuts an upper surface 60 of an associated one of the lateral walls 20 of the vehicle bed 18 to retain the rod 12 on each of the lateral walls 20 of the vehicle bed 18. More particularly, each of the mounting members 54 has a longitudinal axis 90, 92 oriented perpendicular to a longitudinal axis 94 of said rod 12.

A guide post 62 has a bottom end 64 pivotally coupled to the rod 12. The guide post 62 further has a top end 65 positioned opposite of said bottom end 64. The guide post 62 is selectively positionable in a deployed position extending upwardly from the rod 12 so the guide post 62 may be viewed from a cabin 66 of the vehicle 68. The guide post 62 is pivotable between the deployed position and a storage position that has the guide post 62 positioned parallel to the rod 12. The guide post 62 may have a length between 28 cm and 33 cm. The guide post 62 may have a bright color to make the guide post 62 more visible from the cabin 66 of the vehicle 68.

A bracket 70 is coupled to the tubular first portion 22. The bottom end 64 of the guide post 62 is pivotally coupled to the bracket 70. A fastener 72 extends through the bracket 70 and the bottom end 64 of the guide post 62 to retain the guide post 62 on the bracket 70. The fastener 72 may comprise a nut and bolt 74 of any conventional design.

A pair of washers 76 is each positioned between the bottom end 64 of the guide post 62 and the bracket 70. Each of the washers 76 frictionally engages the bottom end 64 of the guide post 62 to retain the guide post 62 in the deployed position. Each of the washers 76 may be comprised of a resiliently compressible material. A plurality of caps 78 is positioned on associated ones of the primary 56 and secondary 58 ends of each of the mounting members 54. The caps 78 may prevent the mounting members 54 from scratching the upper surface 60 of each of the lateral walls 20.

In use, the rod 12 may be used to couple the vehicle 68 to a goose neck trailer 80. The rod 12 may be positioned across the vehicle bed 18 so the rod crosses over a front side 81 of a towing ball 82 in the vehicle bed 18. The guide post 62 may be positioned in the deployed position. The vehicle 68 may be driven rearwardly toward the goose neck trailer 80 to be coupled to the towing ball 82. The vehicle 68 may be driven until the hitch 83 of the goose neck trailer 80 abuts the guide post 62 to align the hitch 83 with the towing ball 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A trailer attachment guide assembly in combination with a vehicle, comprising: a vehicle comprising a pickup truck including a vehicle bed and a pair of lateral walls extending upwardly from said vehicle bed, said lateral walls being positioned opposite of each other, said lateral walls being spaced from each other, each of said lateral walls having a longitudinal axis and an upper surface; a rod having a first end and a second end, said rod being selectively telescopically extendable along a longitudinal axis extending through said first and second ends whereby said rod is positioned over said vehicle bed such that said rod is further positioned over said upper edges of said lateral walls of said vehicle bed; a guide post having a bottom end pivotally coupled to said rod, said guide post being selectively positionable in a deployed position extending upwardly from said rod, whereby said guide post is viewable from a cabin of the vehicle, said guide post having a top end positioned opposite of said bottom end, said top and bottom ends defining terminal ends of said guide post, said guide post being linear from said top end to said bottom end, said post being completely positioned above said upper surfaces when said rod is positioned above said upper surfaces; and a pair of mounting members, each of said mounting members being elongated and tubular shaped, each of said mounting members having a primary end and a secondary end, each of said mounting members being coupled to an associated one of said first and second ends of said rod, each of said mounting members having a longitudinal axis being oriented perpendicular to the longitudinal axis of said rod, each of said mounting members being oriented parallel to each other, each of said mounting members abutting said upper surface of an associated one of the lateral walls of the vehicle bed such that said respective longitudinal axis of each of said mounting members is parallel to said associated longitudinal axis of said lateral walls to retain said rod above the lateral walls of the vehicle bed.

2. The assembly according to claim 1, further including said rod including;
    a tubular first portion, said tubular first portion having an open end; and
    a second portion, said second portion having an insertion end, said open end of said tubular first portion insertably receiving said insertion end of said second portion whereby said second portion is slidably positioned within an interior of said tubular first portion.

3. The assembly according to claim 2, further including said second portion being positionable in a first position having said second portion positioned within said interior of said tubular first portion whereby said second end of said rod is positioned adjacent to said open end of said tubular first portion, said rod being positionable in a second position having said second portion being selectively extended outwardly from said interior of said tubular first portion along the longitudinal axis of said rod whereby said second end of said rod is extended a selectable distance away from said open end of said tubular first portion.

4. The assembly according to claim 2, further including a stopper, said stopper comprising a closed ring, said stopper including a flange extending inwardly from an end of said stopper, said stopper being positioned around an outer surface of said tubular first portion such that said open end of said tubular first portion abuts said flange, an inner edge of said flange forming an opening to insertably receive said insertion end of said second portion.

5. The assembly according to claim 4, further including a sleeve, said sleeve being positioned around said second portion adjacent to said insertion end whereby an outside surface of said sleeve abuts an inner surface of said tubular first portion, a front edge of said sleeve abutting a rear side of said flange when said second portion is extended outwardly of said tubular first portion whereby extension of said second portion is restricted.

6. The assembly according to claim 1, further including said guide post being pivotable between said deployed position and a storage position wherein said guide post is pivoted downwardly and positioned parallel to said rod.

7. The assembly according to claim 1, further including a bracket, said bracket being coupled to said tubular first portion, said bottom end of said guide post being pivotally coupled thereto.

8. The assembly according to claim 7, further including a fastener extending through said bracket and said bottom end of said guide post to retain said guide post on said bracket.

9. The assembly according to claim 7, further including a pair of washers, each of said washers being positioned between said bottom end of said guide post and said bracket, each of said washers frictionally engaging said bottom end of said guide post to retain said guide post in said deployed position.

10. The assembly according to claim 1, further including a plurality of caps, each of said caps being positioned on associated ones of said primary and secondary ends of each of said mounting members.

* * * * *